United States Patent [19]

Braksmayer

[11] Patent Number: 4,556,698

[45] Date of Patent: Dec. 3, 1985

[54] FLAME RETARDANT THERMOPLASTIC POLYCARBONATE POLYMERS

[75] Inventor: Diza P. Braksmayer, Cranbury, N.J.

[73] Assignee: FMC Corporation, Philadelphia, Pa.

[21] Appl. No.: 677,447

[22] Filed: Dec. 3, 1984

[51] Int. Cl.$^4$ .......................................... C08G 63/62
[52] U.S. Cl. .................................. 525/469; 524/121; 524/129; 525/461; 525/470; 528/167; 528/169; 528/398; 528/400
[58] Field of Search ............... 528/167, 169, 398, 400; 524/121, 129; 525/461, 469, 470

[56] References Cited

U.S. PATENT DOCUMENTS

| | | | |
|---|---|---|---|
| 3,933,734 | 1/1976 | Mark et al. | 260/45.7 S |
| 4,036,809 | 7/1977 | Keblys | 260/45.7 P |
| 4,087,408 | 5/1978 | Moedritzer | 528/169 |
| 4,195,156 | 3/1980 | Bruckdorfer | 528/171 |
| 4,280,951 | 7/1981 | Saito et al. | 260/45.8 R |
| 4,322,520 | 3/1982 | Schmidt et al. | 528/169 |
| 4,401,802 | 8/1983 | Schmidt et al. | 528/169 |
| 4,444,930 | 4/1984 | Guerin et al. | 524/125 |

*Primary Examiner*—Lester L. Lee
*Attorney, Agent, or Firm*—Robert D. Jackson; Eugene G. Horsky

[57] ABSTRACT

This invention claims flame retardant polycarbonate resin compositions comprising an aromatic carbonate polymer and, as a novel flame retardant additive therefor, a phosphorus-containing polycarbonate composition produced by carrying out a polycarbonate condensation in which at least part of the diol compound is a bishydroxyalkylphosphine oxide. Also described are the novel flame retardants per se.

11 Claims, No Drawings

FLAME RETARDANT THERMOPLASTIC POLYCARBONATE POLYMERS

This invention relates to flame retardant thermoplastic polymers such as polycarbonates and the like. More particularly, the invention pertains to flame retardant polycarbonates in which the fire retardant is a phosphine oxide derivative.

It is well known to produce plastic articles from thermoplastic or heat moldable polymers. It is likewise well known to incorporate a fire retardant in the thermoplastic polymer to increase its flame resistance and that of the plastic products made therefrom.

A class of thermoplastic polymers that has seen considerable commercial application in recent years are the polycarbonates. These are polyesters of carbonic acid with an aromatic dihydroxy compound and are prepared by reacting phosgene or carbonic ester with a diphenolic component. Characterized by excellent mechanical properties and low chemical reactivity, the polycarbonates are much employed in the manufacture of inustrial and engineering plastics.

Although polycarbonates are inherently of low combustibility, being self-extinguishing, it is nevertheless often desirable to ameliorate their flame resistance by means of fire retardant additives. For instance, the flame resistance of polycarbonates can be augmented by blending them with an organohalogen compound such as decabromodiphenyl ether. Instead of using a halogenated additive, halogen may be chemically introduced into the polycarbonate substrate by conducting the polymer synthesis in the presence of a halogenated dihydroxy aromatic reactant such as tetrachloro- or tetrabromobisphenol-A. There are, however, various problems that arise attendant the use of organohalogen compounds as flame retardants in thermoplastic polymers. For instance, polycarbonates incorporating these additives suffer from such drawbacks as diminished thermal stability under processing conditions and accelerated U.V. degradation. Moreover, when polycarbonates containing organohalogen fire retardants are incinerated, there is a copious evolution of noxious hydrochloric or hydrobromic acid vapors—a manifestly undersirable trait.

Another family of known flame retardants for polycarbonates are the metal salts of benzenesulfonic acid disclosed in U.S. Pat. No. 3,933,734. In U.S. Pat. No. 4,195,156, benzenesulfonic acid salts are described having hyroxy substituents on the benzene ring. These derivatives can copolymerize during polycarbonate preparation and thereby become part of the polymer backbone. Although benzenesulfonic acid salts have the advantage of being effective at low concentrations, they exhibit the deleterious side effect of promoting accelerated hydrolysis of polycarbonate resins.

Organophosphorus compounds, particularly organic phosphates, are also well known as fire retardants. Organic phosphates are not, howwever, generally adaptable as flame retardants for polycarbonates. The reason for this is that organic phosphates are not sufficiently stable under conditions at which polycarbonates are manufactured and processed. Such lack of stability can take the form of chemical decomposition of the additive or loss thereof through volatilization caused by too high a vapor pressure.

Organophosphorus compounds having carbon-phosphorus bonds are more thermally stable for use as flame retardants in polycarbonates. One such group of additives are the phosphonates described in U.S. Pat. Nos. 4,036,809 and 4,444,930 and the phosphinates described in U.S. Pat. No. 4,280,951.

It has now been discovered that improved flame retardant polycarbonates, free of polymer degradation, can be realized by mixing the polycarbonates with certain novel phosphorus-containing polycarbonate flame retardants and the provision of such flame retardant polycarbonate and the phosphorus-containing polycarbonate flame retardants constitutes the principal objects and purpose of the invention.

The novel phosphorus polycarbonates of the invention are prepared by reacting a carbonyl halide with a bishydroxyalkylphosphine oxide in the presence of an acid acceptor. In general, the reaction is conducted in the known manner of preparing polycarbonate resins except that the bishydroxyalkylphosphine oxide is substituted for at least part of the normlly used aromatic dihydroxy compound. Typically, the reaction is carried out in a methylene chloride solution of pyridine using phosgene as the carbonyl halide.

The preferred phosphorus polycarbonate flame retardants of the invention are those in which the bishydroxyalkylphosphine oxide is substituted for a part of the aromatic diol normally used in producing polycarbonate resins. A suitable proportion of aromatic diol to bishydroxyalkylphosphine oxide is a mole ratio of from about 5 to 20. As the quantity of the phosphine oxide is increased, so is the percentage of phosphorus and fire retardant capacity of the resulting phosphorus containing resin. A preferred phosphorus assay is in the range of from about 0.5% to about 5% by weight.

The amount of the phosphorus-containing polycarbonates of the invention added to the polycarbonate resin is governed by the degree of flame retardancy that is required. For instance, plastic materials and furnishings in aircraft interiors should be fabricated for maximum flame resistance. Both the quantity employed and phosphorus assay of the phosphine oxide will affect the flame retardant properties of the polycarbonate. Normally, the higher the phosphorus in the phosphorus polycarbonate, the less that is required to attain a given degree of fire retardancy. In this connection, excellent fire retardant polycarbonate resins have been produced which have incorporated therein about 1 to 3 parts per hundred of the herein phosphorus polycarbonate flame retardants containing about 1% by weight of phosphorus.

The bishydroxyalkylphosphine oxide generally suitable for the practice of the subject invention can be represented by the following formula:

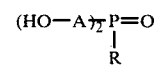

wherein A is an alkylene chain having from 1 to 12 carbon atoms and R is a hydrocarbon radical of from 1 to 12 carbon atoms. An exemplary list of compounds falling within the ambit of the formula aforesaid is set forth below.

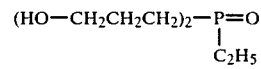

-continued $$(HO-CH_2CH_2)_2-\underset{\underset{C_6H_5}{|}}{P}=O$$

$$(HOCH_2CH_2CH_2)_2-\underset{\underset{sec.-C_4H_9}{|}}{P}=O$$

$$(HOCH_2CH_2CH_2)_2-\underset{\underset{C_3H_7}{|}}{P}=O$$

$$\left(HOCH_2\underset{\underset{CH_3}{|}}{CH}\right)_2-\underset{\underset{C_5H_{11}}{|}}{P}=O$$

$$[HO(CH_2)_4]_2-\underset{\underset{C_2H_5}{|}}{P}=O$$

$$\underset{HOCH_2CH_2}{HOCH_2CH_2CH_2}\underset{\underset{C_2H_5}{|}}{P}=O$$

$$(HOCH_2CH_2CH_2)_2\underset{\underset{n-C_6H_{13}}{|}}{P}=O$$

$$(HOCH_2CH_2)_2P=O$$
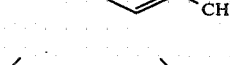

$$\left(HOCH_2\underset{\underset{C_2H_5}{|}}{CH}CH_2\right)_2-\underset{\underset{n-C_3H_7}{|}}{P}=O$$

Bishydroxyalkylphosphine oxides are, as a class, known chemical entities for which an in-depth discussion would be superfluous. Suffice to say they are conveniently obtained by reacting a monosubstituted phosphine with 2 moles of an ethylenically unsaturated aliphatic alcohol in the presence of a free radical source to give a bishydroxyalkylphosphine which is then oxidized to the corresponding phosphine oxide. For further details on the description and preparation of bishydroxyalkylphosphine oxides, reference is hereby made to the technical and patent literature.

In order to more fully and clearly illustrate the invention, the following nonlimiting examples are presented below.

EXAMPLE I

This example illustrates a phosphorus-containing polycarbonate flame retardant and its preparation.

Into a 1 liter-4 neck RB flask, equipped with a mechanical stirrer, bubbler, dry-ice condenser, 20° C.-30° C. water bath and thermometer was placed s-butyl bis(hydroxypropyl)phosphine oxie (2.2 g, 0.01 m), bisphenol-A (20.5 g, 0.09 m), in dried methylene chloride (400 ml), and dried pyridine (45 ml). Phosgene gas was slowly bubbled in. A solution color change from water-white to red occurred within 45 minutes. There was added a total of 84 g, 0.85 m of phosgene. A positive nitrogen flow over the reaction material was maintained overnight. The brown reaction liquid was slowly poured into a large beaker of water stirring vigorously. A beige organic layer formed on the bottom. The organic layer was washed several times with water and aqueous saturated sodium chloride solutions to break up emulsions until the pH of the wash water was approximately 7. The organic layer was concentrated and poured into vigorously stirring methanol. A being solid formed immediately which was filtered and dried under vacuum resulting in 19.3 g of a beige powdery product: % P=1.09; viscosity (measured on a solution of 2 g solid dissolved in 50 ml methylene chloride) on phosphine oxide-based polycarbonate=0.73 cts, on commercial polycarbonate resin=1.72 cts.

EXAMPLE II

This example illustrates a flame retardant polycarbonate resin composition containing a phosphorus-containing polycarbonate fire retardant. A polycarbonate resin was compounded with 1 and 3 phr of the phosphine oxide-based polycarbonate flame retardant additive of Example I. Flammability of molded samples were compared to polycarbonate with no flame retardant, to polycarbonate containing a nonreactive phosphine oxide additive, trioctyl phosphine oxide (TOPO), and to a commercial polycarbonate resin containing a reactive brominated flame retardant.

The flame retardancy of the polycarbonate resin samples aforesaid were evaluated in accordance with the test procedure of Underwriter's Laboratories, Inc., Bulletin UL-94, January, 1980, Burning Test For Classifying Materials. In this procedure, test specimens of the resin are molded into test bars about 5 by ½ by about 1/16 to ⅛ inch thick. Five (5) test bars are prepared for each resin specimen. In accordance with the UL-94 procedure, materials are classified as V-0, V-1 or V-2. The results are based on five specimens. The criteria for rating per UL-94 is briefly as follows:

"VO-0"; Average flaming and/or glowing after removal of the igniting flame shall not exceed 5 seconds and none of the specimens shall drip flaming particles which ignite absorbent cotton.

"V-1": Average flaming and/or glowing after removal of the igniting flame shall not exceed 25 seconds and the flowing does not travel vertically for more than one-eighth inch of the specimen after flaming ceases and glowing is incapable of igniting absorbent cotton.

"V-2": Average flaming and/or glowing after removal of the igniting flame shall not exceed 25 seconds and the specimens drip flaming particles which ignite absorbent cotton.

The oxygen indices (OI) of the flame retardant polycarbonate resins of the invention were ascertained by the method outlined in ASTM D-2863. The OI was determined on type A test resin specimens 5 inches by ⅛ inch by ¼ inch and subjected them to a flow rate of 4±1 cm³/second combined oxygen and nitrogen.

The results of testing a nonflame retardant polycarbonate resin (control), the flame retardant phosphorus polycarbonate of the invention together with the control resin, a nonreactive phosphine oxide flame retardant with the control, and a commercial reactive brominated flame retardant are set forth in the Table below.

|  | Oxygen Index | UL-94 |
|---|---|---|
| Lexan ® 141 (Polycarbonate)[1] | 25 | V-2 |
| Lexan ® 141 + 1 phr of Example I | 28.7 | V-0 |

-continued

| | Oxygen Index | UL-94 |
|---|---|---|
| Lexan ® 141 + 3 phr of Example I | 31.3 | V-0 |
| Lexan ® 141 + 1 phr TOPO[2] | 26.8 | V-2 |
| Lexan ® 2014[3] | 29.0 | V-0 |

[1]Lexan 141 is the trademark of a nonflame retardant polycarbonate resin sold by the General Electric Corporation.
[2]TOPO = trioctylphosphine oxide
[3]Lexan 2014 is the trademark of a bromine-containing flame retardant polycarbonate resin sold by the General Electric Corporation.

What is claimed is:

1. A flame retardant phosphorous-containing polycarbonate composition produced by carrying out a polycarbonate condensation in which at least part of the diol compound is a bishydroxyalkylphosphine oxide.

2. The compositon of claim 1 in which the polycarbonate condensation is carried out in the presence of an aromatic diol reactant.

3. The composition of claim 2 wherein the diol reactant is bisphenol-A.

4. The composition of claim 1 in which the bishydroxyalkylphosphine oxide has the formula:

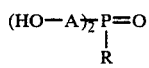

wherein A is an alkylene chain of 1 to 12 carbon atoms and R is a hydrocarbon radical of 1 to 12 carbon atoms.

5. The composition of claim 4 wherein the phosphorus content thereof is from about 1% to about 10% by weight.

6. The composition of claim 5 wherein the bishydroxyalkylphosphine oxide is s-butyl bis(3-hydroxypropyl) phosphine oxide.

7. A flame retardant polycarbonate resin composition comprising an aromatic carbonate polymer and, as a flame retardant additive therefor, a phosphorus-containing polycarbonate composition produced by carrying out a polycarbonate condensation in which at least part of the diol compound is a bishydroxyalkylphosphine oxide.

8. The resin composition of claim 7 in which the polycarbonate condensation of producing the flame retardant is carried out in the presence of an aromatic diol reactant.

9. The resin composition of claim 7 wherein sufficient phosphorus-containing polycarbonate additive is used to provide a resin composition having a phosphorus content of from about 0.5% to about 5% by weight.

10. The resin composition of claim 7 wherein the bishydroxyalkylphosphine oxide used in forming the phosphorus-containing polycarbonate flame retardant has the formula:

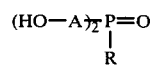

wherein A is an alkylene chain of 1 to 12 carbon atoms and R is a hydrocarbon radical of 1 to 12 carbon atoms.

11. The resin composition of claim 10 wherein the bishydroxyalkylphosphine oxide is s-butyl bis(3-hydroxypropyl)phosphine oxide.

* * * * *